Aug. 26, 1958 M. VANZO 2,848,863
APPARATUS FOR MAKING REINFORCED RUBBER TUBING
Filed Jan. 27, 1956 5 Sheets-Sheet 2
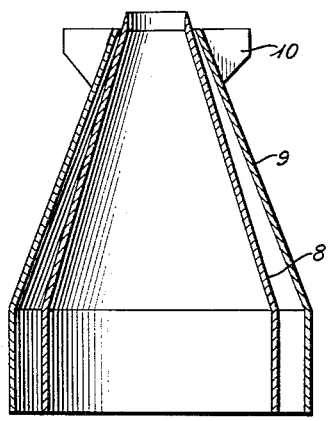
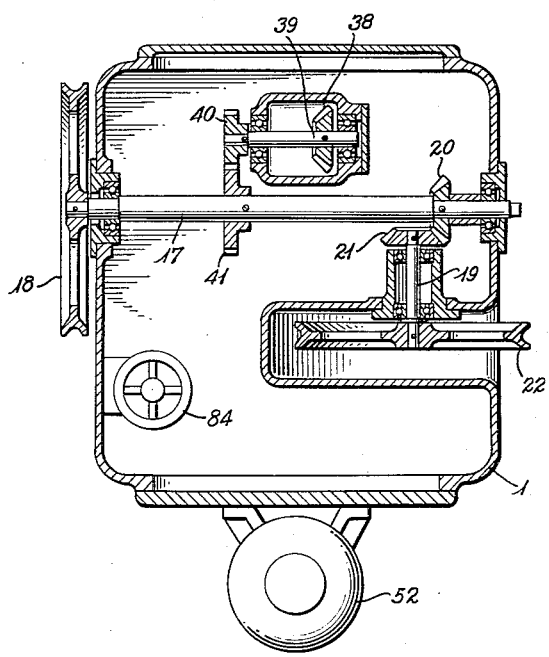
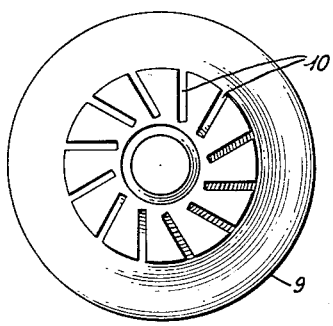
INVENTOR
*Marcello Vanzo*
BY *Stevens, Davis, Miller and Mosher*
ATTORNEYS Aug. 26, 1958  M. VANZO  2,848,863
APPARATUS FOR MAKING REINFORCED RUBBER TUBING
Filed Jan. 27, 1956  5 Sheets-Sheet 3

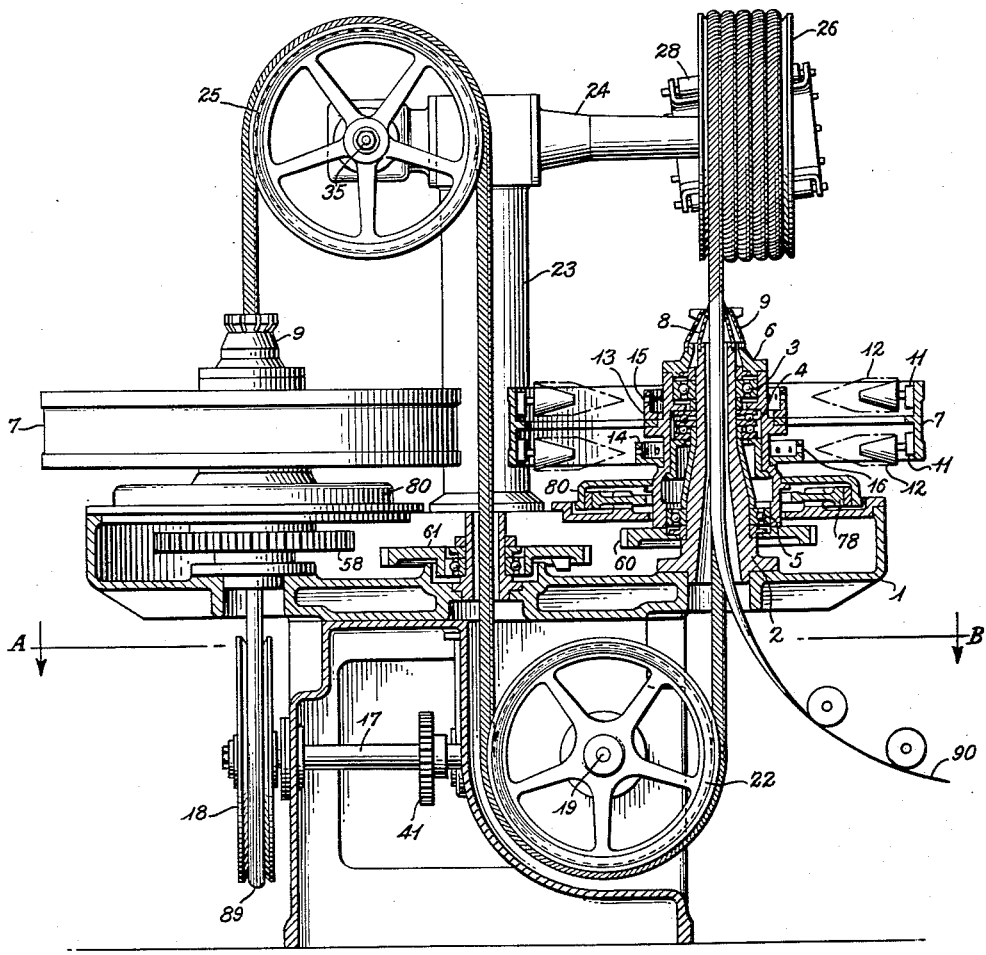

INVENTOR
*Marcello Vanzo*
BY
*Stevens, Davis, Miller and Mosher*
ATTORNEYS

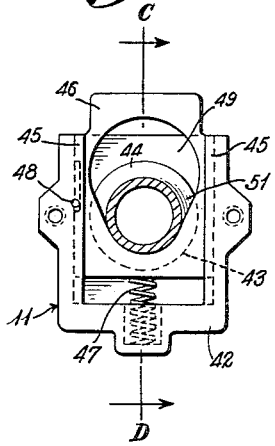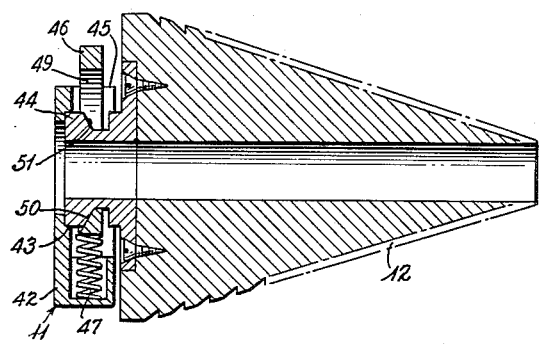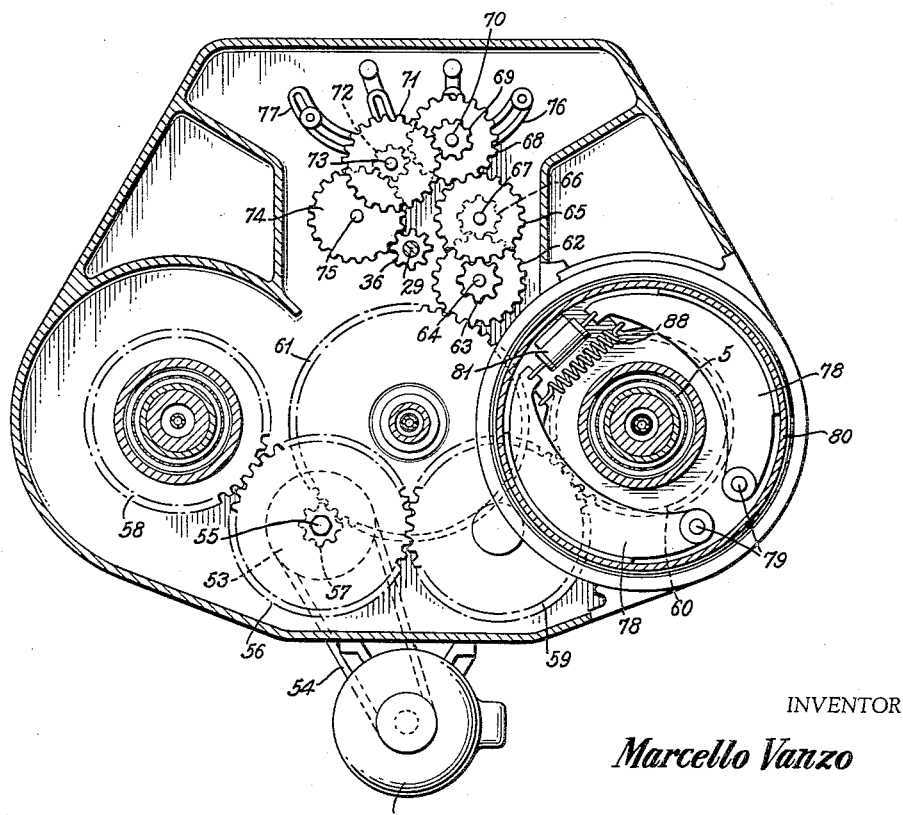

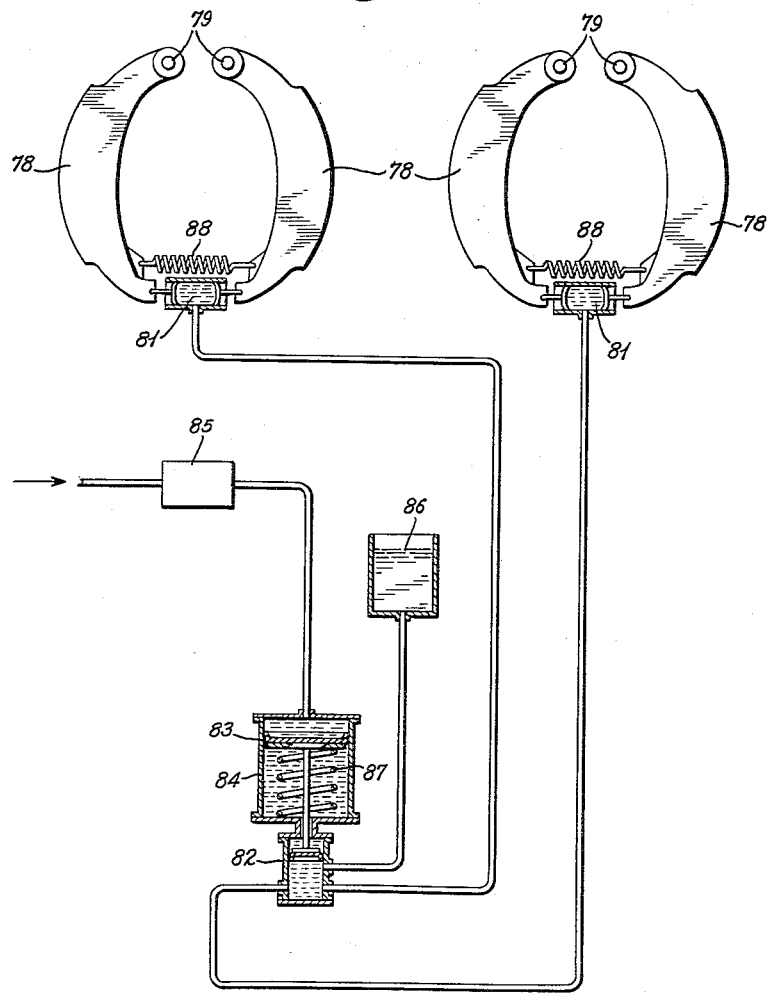

United States Patent Office 2,848,863
Patented Aug. 26, 1958

2,848,863
APPARATUS FOR MAKING REINFORCED RUBBER TUBING

Marcello Vanzo, Milan, Italy, assignor to Pirelli S. p. A., Milan, Italy

Application January 27, 1956, Serial No. 561,886

Claims priority, application Italy October 13, 1955

13 Claims. (Cl. 57—15)

The present invention relates to a machine for covering rubber tubes used for conducting fluids under pressure and therefore subject to high internal stresses, with a plurality of reinforcing threads.

The covering of such rubber tubes is usually performed by machines that apply to a crude tube two successive spirals of thread in opposite directions with sufficient regularity but at a rotational speed that is necessarily limited.

The machine, which is the object of the present invention, is capable of effecting these spirals at a much greater speed since its structural features are such as to permit extremely high speeds of operation. These features are set forth below:

Rotatable spool-carriers are mounted side by side with respect to each other and, between the point of application of each layer of thread to that of the successive layer, there are provided two controlled pulleys, one for applying traction and one for the return of the tube, which serves to reduce the traction upon the crude tube to that necessary for unwinding the threads of the spools mounted on a single rotor.

The rotors for the spool-carriers have the shape of annular bands whose cross section is most favorable to resisting the considerable stresses, due to centrifugal force, imparted to them by the spools which they support.

The spools or bobbins are secured to the interior surface of the annular bands with their axes disposed in horizontal and radial direction. They are, therefore, equidistant from the tube to be spirally covered and consequently all threads unwound therefrom are subjected to centrifugal forces in the same manner.

The spools are disposed at superimposed levels with the axes of the spools of two adjacent levels in staggered relationship to each other, which permits reducing to a minimum the diameter of the rotors and, consequently, the stresses transmitted by the centrifugal force, as well as keeping the threads at an equidistance from each other.

The spools are mounted on rotors by means of a special device that engages the core of the spool on which the thread is wound.

The winding of the spool on the core is effected in such a way as to insure uniform unwinding even at very high speeds.

The travel of the thread from the spools to the central part of the rotor is radial and rectilinear, thus avoiding ballooning of the thread in the peripheral zone.

These and other characteristics of the invention, as well as the operation of the machine, will become apparent from a reading of the following specification together with the accompanying drawings wherein:

Fig. 1 is a front elevation, partly in section, of the machine;

Fig. 2 is a vertical section of the guide for the tube to be covered and for the threads to be wound on the tube;

Fig. 3 is a plan view of the guide of Fig. 2;

Fig. 4 is a horizontal section on the line A—B of Fig. 1;

Fig. 7 is a detail of the device for securing the spools to the rotors;

Fig. 8 is a section on the line C—D of Fig. 7;

Fig. 9 is a plan section of the transmission means;

Fig. 10 represents the oil distribution scheme for the brakes of the rotors.

Figure 5:
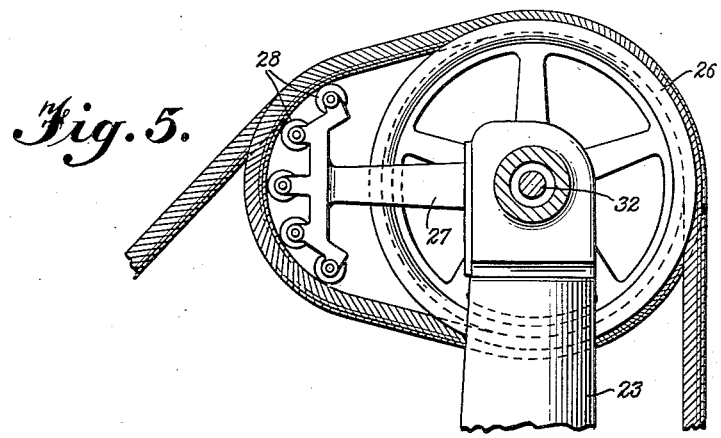
Fig. 5 is a detail, partly in elevation, of the traction drum for the completed tube and of the deflecting rollers.
Figure 6:
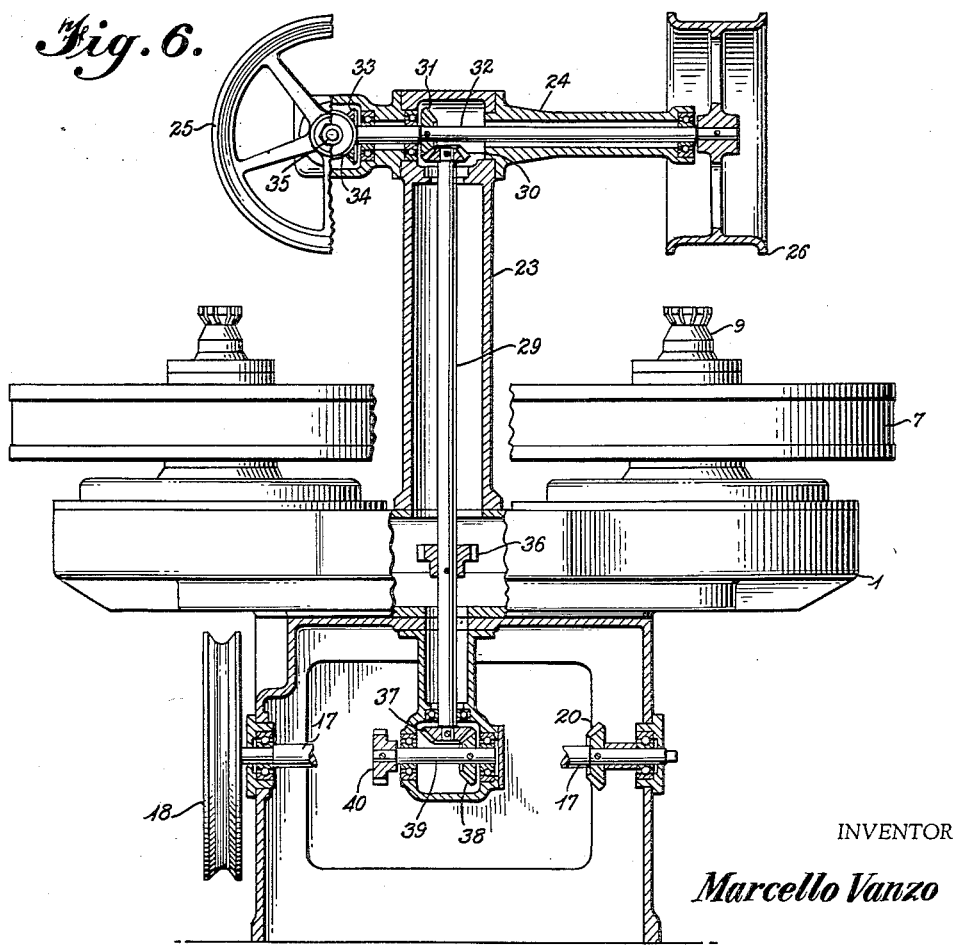
Fig. 6 is a front elevation of the machine, partly in section in correspondence with the organs serving to drive the controlled pulleys and the traction drum.

The machine is constituted of a strong frame-bed 1, which has mounted on its upper surface the spindles 2 that support by means of ball bearings 3, 4 and 5, the hubs 6 each rigidly associated with the corresponding spool-carrier 7. The spindles 2 are perforated and carry at the summit thereof a guide 8 of conical shape (Figures 2 and 3) having a diameter of smaller dimensions so as to allow free passage of the tube to be covered. The guide 8 can be readily replaced for the purpose of adapting it to the diameter of the tube to be covered.

The hubs 6 are extended upwardly and carry at the summit thereof a second guide 9 also of conical shape. This second guide 9, which rotates in rigid fashion with hubs 6, terminates in correspondence with its lesser diameter at a level slightly lower than the upper end of stationary guide 8. Around the end of the lesser diameter of rotatable guide 9 there are provided a number of grooves 10 corresponding to that of the spools mounted on the respective rotor.

On the spool-carrying rotors 7 are secured, at two different levels, devices 11 for anchoring spools 12, those of the upper level being staggered with respect to those of the lower level. Each of the rotors 7 carries two concentric rings 13 and 14 provided with thread guiding bushes 15 and 16 of a number equal to that of the spools 12.

On shaft 17, supported by frame 1, is mounted a feed pulley 18, whereas on shaft 19, normal to shaft 17, from which it receives a rotary motion through the couple of conical gears 20 and 21, shown in Fig. 4, is mounted return pulley 22. Column 23 supports, by means of arm 24, the return pulley 25 and traction drum 26. Pulleys 18, 22 and 25 as well as traction drum 26 are controlled. To the rear of arm 24 (Fig. 5) is also secured an arm 27 which carries a series of deflection rollers 28, freely rotatable about their axes which are obliquely disposed with respect to the axis of traction drum 26. Column 23 houses vertical shaft 29 which carries, mounted on its upper end, conical gear 30 which meshes with another conical gear 31 mounted on horizontal shaft 32 housed in arm 24 at the end of which is fixed traction drum 26. At the other end of shaft 32 is mounted a conical gear 33 which in turn meshes with another conical gear 34 mounted on horizontal shaft 35 normal to shaft 32. Shaft 35 carries pulley 25 mounted on its front end. On the central part of shaft 29 is mounted gear 36 which, as explained hereinafter, receives the movement of the gears which control the rotation of rotors 7. On the lower end of shaft 29 is mounted conical gear 37 which meshes with another conical gear 38 mounted on horizontal shaft 39. Shaft 39 carries secured to its other end a gear 40 which meshes with gear 41 keyed to shaft 17.

The devices 11 for securing spools 12 on rotors 7 are each constituted of a plate 42 rigidly attached to rotors 7 and carrying at the center thereof a circular centering slot 43 of a diameter equal to the diameter of flange 44 protruding from the core of spool 12. Plate 42 carries at the sides of centering slot 43 two parallel channels 45 in which slides a second plate 46. A spring 47 urges plate 46 against stop 48. In the central part of sliding plate 46 is provided a profiled aperture 49 which, in its upper part, has a semicircular shape of a diameter larger than that of flange 44 and is limited below by two V-shaped surfaces connected at the center thereof by a conical surface 50 equal to a second conical surface 51 located at the rear of flange 44.

In order to mount spool 12 in the fastening device, sliding plate 46 is depressed until the centering slot 43 is completely uncovered. Flange 44 protruding from the core of spool 12 is introduced into said centering slot, plate 46 rises again urged by spring 47 and the conical surface 50 engages the corresponding conical surface 51 located at the rear of flange 44 thus forcing the flange itself against the bottom of centering slot 43.

The machine is driven by motor 52 whereby movement is transmitted to pulley 53 with the aid of small trapezoidal transmission belts 54. Pulley 53 is keyed to shaft 55 which also carries gears 56 and 57. Gear 56 meshes with gear 58, rigidly connected with the rotating assembly which includes the spool-carrying rotor located at the left side of the machine, thus imparting to the platform a rotational movement in clockwise direction. The same gear 56 also meshes with idling gear 59 which in turn meshes with gear 60 rigidly connected to the spool-carrying rotor located at the right of the machine. Gear 60 imparts to the spool-carrying ring a counterclockwise rotation, i. e. opposite to that of the spool-carrying ring located at the left of the machine. Gear 57 meshes with gear 61 which, by means of gears 62 and 63 mounted on shaft 64, gears 65 and 66 mounted on shaft 67, gears 68 and 69 mounted on shaft 70, gears 71 and 72 mounted on shaft shaft 73, gear 74 mounted on shaft 75, and gear 36, controls the rotation of shaft 29 and consequently that of pulleys 18, 22 and 25 and of traction drum 26.

The ratio between the feeding speed of the tube and the rotational speed of the spool-carrying rotors may be varied by changing gears 68—69 and 71—72 and there are provided for such purpose quadrants 76 and 77 to permit a variation of the wheel base between these gears.

In order to brake the rotation of rotors 7 there are provided two expansion brakes constituted of two shoes 78 pivoted at 79 on the stationary part of the machine. Each pair of shoes 78 is pressed against the interior part of the revolving bell 80 by the action of two pistons contained in cylinders 81. Oil is caused to flow into these cylinders by means of a pump 82 which is operated by piston 83 when the latter is pushed downwardly by a pressure fluid delivered to cylinder 84 through electrically controlled valve 85. Reservoir 86 replenishes any loss of oil, if necessary. As the action of the compressed liquid terminates, piston 83 is pushed toward the top by the previously compressed spring 87.

Spring 88 returns the shoes 78 to a position of rest when the pressure exerted by the oil in cylinder 81 has ceased.

The operation of the machine is as follows:

The crude rubber tube to be covered 89 coming from the die is collected in a rotatable cylindrical pan from which it is unwound by means of a conventional unwinding device. It is then passed into the machine from the bottom, turning around controlled pulley 18, rising vertically through the interior of stationary spindle 2, coaxially with the spool-carrying rotor 7 arranged at the left side of the machine, and receives its first spiral winding in correspondence with the two guides 8 and 9 of the left rotor. It then passes around return pulley 25, descends vertically, passes around return pulley 22 and rises again vertically guided into the interior of the second stationary spindle 2, coaxially with the spool-carrying rotor arranged at the right side of the machine. Before entering into the interior of spindle 2 corresponding to the second rotor, it is covered with a strip of crude rubber 90 and then again covered with a second spiral winding in opposite direction to the preceding one in correspondence with guides 8 and 9 of the rotor at the right.

After receiving the second spiral winding the tube is wound around traction drum 26 and deflection rollers 28 whereupon it is collected in a second rotatable pan. The thin strip of rubber 90 interposed between two successive windings serves to lock these together during vulcanization.

In order to insure sufficient traction for the covered tube, the latter is wound on traction drum 26 forming different spires. To prevent that, with the rotation of the drum, the tube be shifted one step for each turn, the tube leaves drum 26 and returns to it after passing around rollers 28. Since the axis of these rollers is oblique with respect to the axis of drum 26, the tube returning to the drum will rest on the drum itself, to initiate the second spire, immediately adjacent the section of tube that forms the first spire. In this way, the sections of the tube that are wound around tube 26 will be perpendicular to the rotational axis of the drum itself and are prevented from being shifted with the rotation thereof.

The spools 12 used in the machine are wound in the following manner.

The thread is wound on the rigid core which has a conical shape, following a conical helix starting from the end that has the largest diameter and after one or more evolutions it reaches the apex of the cone. From the apex it returns with the same and opposite inclination, following a second conical helix, to the base of the cone and from the latter back to the apex, and so forth. Between one spire and the successive one, there will be, of course, a shifting at the periphery of the cone in order to ultimately arrive at a uniform covering of the core. The successive layers of thread are superimposed upon the first, being shifted according to the axis of the cone itself and never exceeding the largest diameter of the cone.

These two combined movements have the effect of causing the starting points of the conical helices, wherein the direction is the same as the first one, to be arranged according to a cylindrical helix of a pitch corresponding to the thickness of the thread. The spool at the end of the winding cycle thus presents a cylindrical portion of apparently parallel threads formed by the superimposition of the various spires in correspondence with the greater diameters of the core and a conical portion wherein the thread is wound in the form of intersecting spires of high inclination.

A spool of this type will have a tendency of being compacted rather than slackened upon being subjected to centrifugal forces, when it rotates with the point facing toward the center of the rotor and it may be unwound by pulling the thread in axial direction with the slightest effort due to the considerable opening of the cone itself. Moreover, the thread carrying bushes may be mounted at a small distance from the apex of the cone, thus permitting them to occupy with the spools the entire radial space comprised between the annular band and the hub of the rotors and to obtain with a small diameter of the latter a large capacity of spools.

The thread unwound from the spools by the "off top" system passes through the thread-carrying bushes 15, if it is supplied from the upper series of spools, or through bushes 16, if it is supplied from the lower series of spools, then rises following the surface of guide 8, crosses grooves 10 and extends itself in spirals over the surface of the tube.

The machine which is the object of the present invention has a much higher speed than conventional spirally winding machines and therefore is capable of a much higher hourly production rate than the machines heretofore employed.

While the machine is herein described and illustrated as applied to operations involving only two spiral windings in opposite directions, it is noted that in the event a greater number of thread layers are to be applied it will be necessary, of course, to adopt a corresponding number of adjacently disposed spool-carrying rotors.

What is claimed is:

1. A machine for covering an uncured rubber tube with at least two layers of threads helically wound in opposite directions, comprising a base member in which are mounted the reduction and control gears of the machine, a number of vertical perforated spindles equal to the number of thread layers to be applied rigidly mounted on the upper surface defining said base member, a rotor surrounding each spindle, the rotation of the adjacent rotors being in opposite directions, a plurality of thread bobbins secured on each rotor, means for guiding the tube to be covered and the thread used for the covering positioned above the spindles and on the hub of the rotors, a tube feeding device for each rotor being provided for passing a tube to be covered from the bottom to the top in correspondence with the axis of the respective rotors, and a traction device for the tube already covered.

2. A machine for covering an uncured rubber tube with at least two layers of thread helically wound in opposite directions, comprising a base member in which are mounted the reduction and control gears of the machine, a number of vertical perforated spindles equal to the number of thread layers to be applied rigidly mounted on the upper surface defining said base member, a rotor surrounding each spindle, said rotors being side by side and at the same level and the rotation of two adjacent rotors being in opposite directions, a plurality of thread bobbins secured on each rotor, means for guiding the tube to be covered and the thread used for the covering positioned above the spindles and on the hubs of the rotors, a tube feeding device for each rotor being provided for passing a tube to be covered from the bottom to the top in correspondence with the axis of the respective rotors, and a traction device for the tube already covered.

3. A machine for covering uncured rubber tube with at least two layers of threads helically wound in opposite directions according to claim 2, wherein the rotors are constituted of an annular band connected to its respective hub by means of a spoke system, fastening devices for the spools being mounted on the inner surface of said band to maintain said spools rigidly secured with their axes extending both horizontally and radially.

4. A machine for covering an uncured rubber tube with at least two layers of threads helically wound in opposite directions according to claim 2, wherein the rotors are constituted of an annular band connected to its respective hub by a spoke system, the thread spools mounted on the inner surface of said band with their axes extending horizontally and in radial direction being disposed in even number on at least two levels in such a manner that the spools of one level will be staggered with respect to those of the adjacent levels.

5. A machine for covering an uncured rubber tube with at least two layers of threads helically wound in opposite directions according to claim 3, comprising for each spool a fastening device constituted of a plate rigidly secured to the annular band, said plate being provided with a circular centering slot of a diameter corresponding to the diameter of a flange protruding from the core of the spool and two lateral grooves, and a second plate slidable in said grooves which is provided with a profiled aperture having on one side thereof sufficient dimensions for the passage of the flange protruding from the core of the spool while being limited on the other side by two V-shaped surfaces connected through a conical surface whose diameter and inclination are equal to those of a conical surface provided between the flange and the core of the spool, and a spring urging the conical surface, provided in the slidable plate, against the conical surface provided between the flange and the core of the spool in a direction such as to force the flange itself into the circular centering slot provided in the plate secured to the annular band of the rotors.

6. A machine for covering an uncured rubber tube with at least two layers of thread helically wound in opposite directions according to claim 2, wherein the thread spools are mounted in such a way that the travel of the thread from the spool from which it is unwound to the hub of the rotors is rectilinear and radial.

7. A machine for covering an uncured rubber tube with at least two layers of threads helically wound in opposite directions according to claim 2, wherein the feeding device for the tube provided for each rotor for causing the tube to be covered to pass from the bottom to the top according to the axis of the respective rotor, is controlled.

8. A machine for covering an uncured rubber tube with at least two layers of threads helically wound in opposite directions according to claim 7, wherein the feeding device for the tube provided for each rotor for causing the tube to be covered to pass from the bottom to the top according to the axis of the respective rotor is constituted of a pair of pulleys controlled in such a way that the peripheral speed of rotation of the different couples of pulleys will be equal.

9. A machine for covering an uncured rubber tube with at least two layers of threads helically wound in opposite directions according to claim 2, comprising a traction device for advancing the covered tube consisting of a series of rollers supported by the stationary part of the machine and whose rotational axes are oblique with respect to the traction drum in such a way that the sections of said tube wound upon said drum will be perpendicular to the rotational axis of the drum itself.

10. A machine for the manufacture of thread reinforced rubber hose, comprising a base member, at least two hollow spindles each secured at one end to said base member, a rotor with its hub rotatably mounted on each said spindle, a plurality of thread bobbin mountings secured on each said rotor adjacent its periphery, means for guiding thread to be wound on a rubber hose attached to the hub of each said rotor at a position beyond the other end of its associated spindle, feeding means for passing a rubber hose through each said spindle, and a traction device for receiving thread reinforced rubber hose.

11. A machine for the manufacture of thread reinforced rubber hose, comprising a base member, at least two hollow spindles each secured at its bottom to said base member, a rotor with its hub rotatably mounted on each said spindle, a plurality of thread bobbin mountings secured on each said rotor adjacent its periphery, means for guiding thread to be wound on a rubber hose attached to the hub of each said rotor at a position above the top end of its associated spindle, feeding means for passing a rubber hose vertically upward through each said spindle, and a traction device for receiving thread reinforced rubber hose.

12. A machine as defined in claim 11 wherein said rotors are disposed in side-by-side relation and all lie in a common plane.

13. A machine as defined in claim 11 wherein each said rotor includes a hub, an annular band and spoke-like elements interconnecting said hub and said annular band and wherein said thread bobbin mountings are secured to the inner surface of said band to maintain thread bobbins with their axes horizontal and radial.

References Cited in the file of this patent

UNITED STATES PATENTS

| 2,053,411 | Zarafu | Sept. 8, 1936 |
| 2,355,019 | Stover | Aug. 1, 1944 |
| 2,732,884 | Vanzo | Jan. 31, 1956 |

FOREIGN PATENTS

| 12,909 | Great Britain | of 1913 |